United States Patent [19]

Weinberger

[11] Patent Number: 4,472,627

[45] Date of Patent: Sep. 18, 1984

[54] AUTHENTICATING AND ANTI-COUNTERFEITING DEVICE FOR CURRENCY

[75] Inventor: Lester Weinberger, Falls Church, Va.

[73] Assignee: The United States of America as represented by the Secretary of the Treasury, Washington, D.C.

[21] Appl. No.: 431,887

[22] Filed: Sep. 30, 1982

[51] Int. Cl.³ ............................................. G06K 19/06
[52] U.S. Cl. .................. 235/487; 235/491; 235/379; 283/901; 283/904
[58] Field of Search ............... 238/487, 491; 283/901, 283/904

[56] References Cited

U.S. PATENT DOCUMENTS 4,095,217  6/1978  Tani et al. .................. 340/324 R
4,298,793  11/1981  Melis et al. .................. 235/487

FOREIGN PATENT DOCUMENTS 488652  4/1976  Australia .

*Primary Examiner*—Gene Z. Rubinson
*Assistant Examiner*—Robert Lev
*Attorney, Agent, or Firm*—Nina M. Lawrence; John R. Manning

[57] ABSTRACT

Currency or other documents or items of value containing a liquid crystal/photovoltaic device which produces a coded display in response to artificial or ambient light. Such a device functions both as an anti-counterfeiting deterrent and also as a means for permitting the man-in-the-street easily to authenticate the validity of a document containing such a device.

18 Claims, 4 Drawing Figures

10 - LIQUID CRYSTAL/PHOTOVOLTAIC DEVICE

12 - CURRENCY PAPER

AUTHENTICATING AND ANTI-COUNTERFEITING DEVICE FOR CURRENCY

ORIGIN OF THE INVENTION

This invention described herein was made by an employee of the United States Government and may be manufactured and used by or for the Government of the United States for governmental purposes and without the payment of any royalties thereon therefor.

TECHNICAL FIELD

This invention relates generally to the field of devices integrated in currency and other security documents for defeating attempted counterfeiting thereof and for easy authentication thereof and, more particularly, to such a device including thin film photovoltaic and liquid crystal materials which are embodied in ordinary paper currency and electrically interconnected to provide a visible display when the currency is exposed to natural or artificial light.

BACKGROUND ART

With the advent of sophisticated copying machines, especially those employing a xerographic color copying process, there has arisen a need for a device which can be incorporated in currency and which can defeat counterfeiting of the currency by such copying machines while at the same time permitting the man in the street easily to authenticate the validity of a piece of currency without the use of sophisticated and expensive authenticating apparatus.

Current anti-counterfeiting techniques include the use of photochromics, holographics, diffraction gratings and other optically variable devices which create in the currency an easily recognizable characteristic which cannot be readily duplicated, copied or counterfeited by xerographic, photographic and other reprographic processes. More specifically, Australian Patent No. 488,652 discloses incorporating in a bank note various optically variable devices, including a thin film liquid crystal material. Furthermore, devices employing a liquid crystal device driven by a photovoltaic element, such as a solar cell or an amorphous silicon material, are disclosed in U.S. Pat. Nos. 4,095,217 and 4,281,208. The following U.S. patents are also incorporated by reference herein and provide background information on the technology involved in the present invention U.S. Pat. Nos.: 4,251,136; 4,133,697; 4,149,665; 4,228,574; 3,758,305; 3,635,981; 4,308,163; and 4,308,164.

SUMMARY OF THE INVENTION

The broad object of the invention is to provide ordinary paper currency or other security document with an anti-counterfeiting and low level authenticating device in the form of a thin film liquid crystal material (LCD) electrically driven by a photovoltaic element, thereby effectively preventing counterfeiting by reprographic apparatus while at the same time providing a low level authenticating device which will permit the man in the street easily to determine the authenticity of a document.

A more specific object of the invention is to incorporate such a device in ordinary paper currency by providing the photovoltaic element in the form of a thin film solar cell including amorphous silicon and by providing the LCD in the form of a thin film nematic liquid crystal material.

DESCRIPTION OF THE PREFERRED EMBODIMENTS

Figure 1:
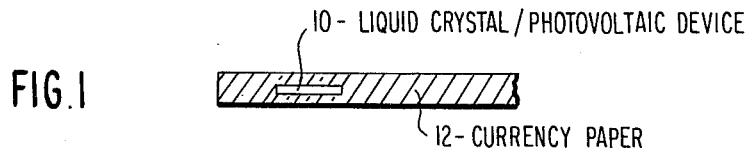
FIG. 1 illustrates a preferred embodiment of the invention wherein the liquid crystal/photovoltaic device is incorporated in a flexible substrate document, such as ordinary paper currency.

FIG. 1 illustrates a preferred embodiment of the invention wherein a thin film liquid crystal/photovoltaic device 10 is embodied within a flexible substrate document, such as ordinary paper currency 12. In at least the area above and below the device 10, the currency is transparent or semitransparent to provide for the passage of light and to permit observation of the display created in the liquid crystal device.

The advent of thin film technology and the inherent physical flexibility of devices employing this technology have made it possible to attach such a device onto or within conventional currency as illustrated in FIG. 1. The basic operation of the liquid crystal/photovoltaic device 10 is that the photovoltaic element produces a voltage when exposed to either artifical or natural light, and then this voltage is applied to the nematic liquid crystal material which changes its optical characteristics to provide a desired display which may be in the form of a code or other pattern determined by the transparent electrodes connected to the liquid crystals.

Figure 2:
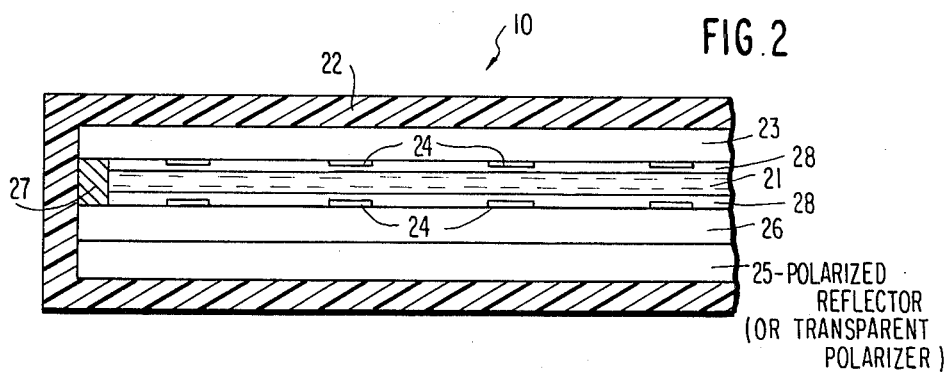
FIG. 2 is a schematic diagram illustrating the various layers of one form of the liquid crystal/photovoltaic device.

FIG. 2 illustrates one form of the liquid crystal/photovoltaic device 10 itself. The various layers appear in the order as illustrated and include: a nematic liquid crystal 21; two alignment layers 28; a plastic encapsulant 22 which can be made from polyester, polyethylene, polycarbonate, cellulose acetate etc.; a standard type polarizer 23; transparent electrodes 24 comprised of stannic and indium oxides and marketed under the trademark NESA; a polarized reflector 25; and a solar cell 26. A spacer 27 separates the polarizer 23 and the solar cell 26. The fact that the display disappears when light is removed also allows the device 10 to be used as a counterfeit deterrent because, if an attempt is made to reproduce with conventional camera techniques or, more importantly, with a color copier genuine currency containing the device 10, then the flash lamps of either the camera or copier will excite the photovoltaic/liquid crystal device, thereby producing on the copy an image of the liquid crystal display; however, the image on the counterfeit copy will not disappear in the absence of light, thereby not only providing the man-in-the-street with a simple method for authenticating currency, but also providing a deterrent to counterfeiting.

The embodiment illustrated in FIG. 2 is an example of a reflective solar cell, but a transparent cell can be obtained merely by replacing the polarized reflector 25 with a transparent polarizer.

The photovoltaic or solar cell 26 may be selected from crystalline silicon, amorphous hydrogenated or amorphous hydrogenated fluorinated silicon alloys (manufactured by Energy Conversion Devices, Troy, Michigan and Bell Laboratories, Murrayhill, N.J.), metallo-organic photovoltaics (manufactured by Xerox Corp., Pasadena, Calif.) and organic or metallo (e.g. vanadium and germanium) organic derivatives of triphenodioxazines as described, for example, in U.S. Pat. No. 3,442,781.

The nematic liquid crystal 21 reacts within 70 milliseconds to produce a display with excellent optical clarity, as compared to the heat- and pressure-sensitive liquid crystals which have been incorporated into paper as shown, for example, in Australian Patent No. 488,652.

Nematic liquid crystals can be formulated into inks so that various colors and hues are produced when the crystals are excited by an electric field.

Liquid crystals possess the property of birefringence. Their refractive indices, a measure of the velocity of light which passes through them, varies with the direction of the light incident upon them. When linearly polarized light passes through liquid crystals, the beam splits into two component beams which are orthogonal to each other and are linearly polarized. These are the ordinary and extraordinary rays. The two beams emerge from the liquid crystal with different phase angles. The emerging beam is then elliptically polarized. When this light is passed through a polarizer, it will emerge linearly polarized.

Figure 3:
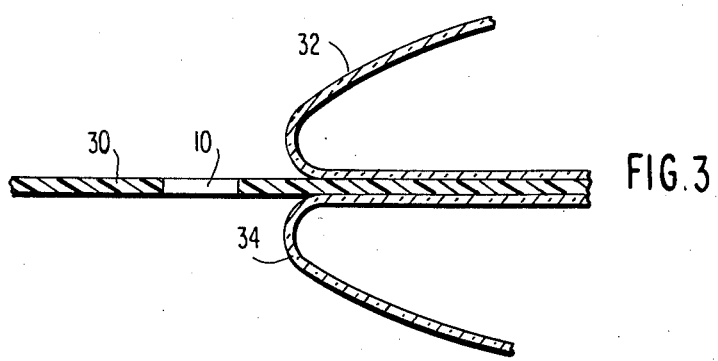
FIG. 3 illustrates another embodiment of the invention wherein the liquid crystal/photovoltaic device is inserted in a window in a substrate sandwiched between two transparent lamina.

As shown in FIG. 3, the liquid crystal/photovoltaic device 10 may be placed in a window formed in a sheet 30 of nylon, the device 10 being heat-bonded into place, ultrasonically bonded, cemented with an adhesive or held mechanically by laminating with transparent sheets 32 and 34 made of polyethylene, polyvinyl chloride, polypropylene or cellulosic derivatives. The liquid crystal/photovoltaic device 10 may also be embodied in paper currency by inserting the device during the paper-making process whereby the paper fibers entrap the device. Since the paper used in such currency is translucent, enough light will be transmitted therethrough to activate the liquid crystal/photovoltaic device. The device may also be bonded by heat or adhesion to the surface of the currency.

The liquid crystal/photovoltaic device 10 can also be embodied in tags attached to clothing and other hard and soft merchandise, thereby providing a security device to protect against counterfeiting of the merchandise.

Figure 4:
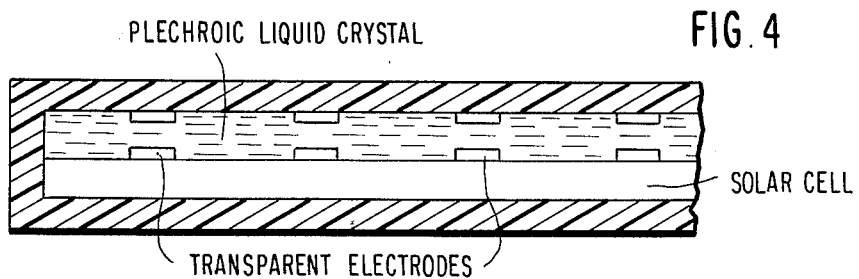
FIG. 4 illustrates the preferred mode of the liquid crystal/photovoltaic device employing a plechroic liquid crystal material.

Furthermore, in the preferred mode the nematic liquid crystal is made of dichroic material, which is also known as plechroic or guest-host material. Such liquid crystals contain dichroic dyes as a guest in a host liquid crystal material, thereby forming a liquid crystal composition useful in liquid crystal displays. As shown in FIG. 4, the advantage of such guest-host liquid crystals is that it makes unnecessary the need of aligning the liquid crystal to the surfaces containing it. Furthermore, the transparent or reflective polarizers are eliminated. Such liquid crystals are disclosed, for example, in U.S. Pat. Nos. 3,787,110; 4,308,163 and 4,308,164.

While the preferred embodiments of the invention have been disclosed in association with currency, it is clear that the liquid crystal/photovoltaic device 10 can be used in combination with other documents and items of value, such as transactional instruments, investment documents, identifiers and security documents. A transactional instrument is defined as one which can be used for a direct purchase of goods and services, e.g., currency or checks, or one that permits billing to an account, e.g., credit cards, letter of credit, autoteller cards, vending machine cards or postage stamps. An investment document is one which represents ownership or proof of a lien, e.g., stocks and bonds. Identifiers include identification cards, automobile licenses, passports and automobile titles. Security documents refer to any of the foregoing instruments, documents, identifiers or other such items which, due to their intrinsic value, sensitivity or susceptibility to fraudulent use or counterfeiting, require a method of production to prevent counterfeiting or fraudulent alteration.

Thus, while the invention has been described above in terms of certain preferred embodiments thereof, it is understood that those skilled in the art will develop obvious modifications thereof which are within the invention's scope which is limited only as defined in the following claims.

I claim:

1. A flexible, paper-like document of value comprising:
    an integral flexible thin-film nematic liquid crystal device which undergoes a visible change in response to an applied voltage; and
    an integral flexible thin-film photovoltaic material electrically coupled to said liquid crystal device and responsive to ambient or artificial light to produce said applied voltage, whereby said document is easily authenticatable by the man-in-the-street and also is unreproducible by reprographic apparatus.

2. The invention as defined in claim 1 wherein said liquid crystal device and said photovoltaic material form respective layers of a sandwich, and wherein said sandwich is encased in a flexible transparent plastic encapsulant.

3. The invention as defined in claim 2 wherein said document is paper currency, and wherein said sandwich is disposed within the fibers of the paper currency.

4. The invention as defined in claim 2 wherein said document comprises a flexible planar substrate containing a hole in which said sandwich is disposed, and transparent flexible lamina sealed to, and covering the opposite faces of, said substrate.

5. The invention as defined in claim 2 wherein said liquid crystal device is the reflective type and said sandwich contains a transparent polarizer layer and a polarized reflector layer.

6. The invention as defined in claim 2 wherein said sandwich contains two transparent polarizer layers.

7. The invention of claim 2 wherein said sandwich is bonded to a surface of said document.

8. The invention of claim 1 wherein said liquid crystal device comprises transparent flexible electrodes shaped to produce a visible code in response to said applied voltage.

9. The invention as defined in claim 1 wherein said liquid crystal device is of the dichroic, guest-host type containing a dichroic dye.

10. The invention as defined in claim 1 wherein said photovoltaic material is selected from the group consisting of amorphous hydrogenated fluorinated silicon, metallo-organic photovoltaic material and organic or metallo-organic derivatives of triphenylodioxazines.

11. The invention as defined in claim 10 wherein said derivatives are selected from the group consisting of vanadium and germanium derivatives.

12. A method of making a flexible paper-like security document comprising the step of incorporating in the document a flexible thin film liquid crystal/photovoltaic device which produces a visible code only when the document is exposed to ambient or artificial light.

13. The invention as defined in claim 12 wherein said document is paper, and comprising inserting the device in the paper fibers during the paper-making process.

14. The invention as defined in claim 12 wherein said document comprises a cellulosic or plastic flexible planar substrate whose opposite surfaces are covered by flexible transparent material, and comprising forming in the substrate a hole, inserting the device in the hole, and then covering the opposite faces with the transparent material.

15. The invention as defined in claim 12 comprising bonding the device to the surface of the document.

16. A method of making a thin flexible paper-like security document easily authenticatable and also non-counterfeitable by copying apparatus of the type which exposes a document to light, comprising:
    forming a light-transparent area in a surface of the document;
    placing a flexible thin-film photovoltaic material within the document and in light communication with the transparent area;
    placing within the document and in light communication with the transparent area a flexible thin-film nematic liquid crystal device which displays an human-observable predetermined image only when electrically energized; and
    electrically interconnecting within the document said photovoltaic material and said liquid crystal device so that when an authentic document is exposed to ambient light, said photovoltaic material electrically energizes said liquid crystal device to alter an optical characteristic of said predetermined image, and so that when the document is exposed to the brighter light in a copying apparatus, said photovoltaic material electrically energizes said liquid crystal device to cause the resulting copy of the document to have permanently formed thereon a visible reproduction of said predetermined image but of a different said optical characteristic.

17. The method of claim 16 wherein said optical characteristic is optical density.

18. The invention as claimed in claim 9 wherein said photovoltaic material is selected from the group consisting of metallo-organic photovoltaic material and organic or metallo-organic derivatives or triphenylodioxazines.

* * * * *